United States Patent [19]

Leason et al.

[11] Patent Number: 5,049,274
[45] Date of Patent: Sep. 17, 1991

[54] FRICTION WELDING PROCESS AND FILTER FORMED THEREBY

[75] Inventors: Hayden Leason, Humacao, P.R.; Thomas A. Cain, Woodstock, Ill.; Andrew J. Boast, Fontana, Wis.

[73] Assignee: Filtertek, Inc., Hebron, Ill.

[21] Appl. No.: 345,783

[22] Filed: May 1, 1989

Related U.S. Application Data

[63] Continuation-in-part of Ser. No. 142,071, Jan. 11, 1988, Pat. No. 4,828,694, and a continuation-in-part of Ser. No. 803,127, Nov. 29, 1985, Pat. No. 4,826,598.

[51] Int. Cl.$^5$ .............................................. B01D 27/00
[52] U.S. Cl. ..................................... 210/445; 55/501; 55/514; 55/502; 55/511; 156/73.1
[58] Field of Search ............... 210/128, 232, 314, 316, 210/466.1, 416.5, 445, 450, 453; 156/73.1; 55/497, 501, 502, 511, 514

[56] References Cited

U.S. PATENT DOCUMENTS

| | | | |
|---|---|---|---|
| 2,692,654 | 10/1954 | Pryor | 55/524 |
| 3,342,719 | 9/1967 | Chen et al. | 156/73.1 X |
| 3,462,803 | 8/1969 | Horton | 156/73.1 X |
| 3,468,731 | 9/1969 | Obeda | |
| 3,471,019 | 10/1969 | Trasen et al. | 210/232 X |
| 3,525,454 | 8/1970 | Frederiksen | |
| 3,686,835 | 8/1972 | Strange et al. | 55/270 |
| 3,782,083 | 1/1974 | Rosenberg | 55/491 |
| 3,784,011 | 1/1974 | Ward | 210/168 |
| 3,796,027 | 3/1974 | Gumtow | 55/502 |
| 3,806,386 | 4/1974 | Burke et al. | 156/73.1 X |
| 3,815,754 | 6/1974 | Rosenberg | 210/445 |
| 3,850,600 | 11/1974 | Monstad | 55/103 |
| 3,872,576 | 3/1975 | Mott | 29/471.7 |
| 3,897,342 | 7/1975 | Schmid et al. | 210/445 |
| 3,932,153 | 1/1976 | Byrns | 55/511 |
| 3,957,469 | 5/1976 | Nebash | 55/270 |
| 4,086,122 | 4/1978 | Bouyoucos et al. | |
| 4,113,627 | 9/1978 | Leason | |
| 4,136,011 | 1/1979 | Joseph et al. | 29/163.5 |
| 4,159,954 | 7/1979 | Gangemi | 210/446 |
| 4,193,876 | 3/1980 | Leeke et al. | |
| 4,250,039 | 2/1981 | Cozzi et al. | 210/416.5 |
| 4,305,988 | 12/1981 | Kocher | |
| 4,347,208 | 8/1982 | Southall | |
| 4,392,958 | 7/1983 | Ganzi et al. | |

(List continued on next page.)

FOREIGN PATENT DOCUMENTS

| | | | |
|---|---|---|---|
| 0225828 | 6/1987 | European Pat. Off. | |
| 2809321 | 9/1979 | Fed. Rep. of Germany | 55/501 |
| 8516808.4 | 9/1986 | Fed. Rep. of Germany | |

OTHER PUBLICATIONS

Vinton Inc. Brochure Entitled, "Variable-Frequency Technique for Vibration Welding of Plastic Parts", by M. J. Behnfeldt and J. V. Bouyoucos.
Vinton Inc. Brochure Entitled, "Hydroweld Variable-High-Frequency Vibration Welders".
Technical Report Describing, "Linear Vibration Welding", dated May 20, 1987.
Vinton Inc. Operating and Service Instructions for Hydroweld TM Linear Vibration Welder, dated Nov. 30, 1981.

Primary Examiner—Bernard Nozick
Attorney, Agent, or Firm—Willian Brinks Olds Hofer Gilson & Lione

[57] ABSTRACT

A process for producing hermetically sealed filters is disclosed. The process includes the steps of providing thermoplastic base and top filter parts and a section of filtration media, sandwiching the media between sections of the base and top filter parts under a compressive force, applying a rapidly repetitive force to at least one of the filter parts to cause movement between the parts and frictional welding of the parts, maintaining the compressive force after frictional welding to allow the melted portion of the parts to solidify and thereby form a fluid seal at the junction of the filter parts and at the junctions of the filtration media and each of the base and top filter parts. In one embodiment, the junction between the filter parts is the periphery of an automatic transmission filter, and the junction is hermetically sealed. A hermetically sealed automatic transmission filter is also disclosed.

22 Claims, 5 Drawing Sheets

U.S. PATENT DOCUMENTS

| | | |
|---|---|---|
| 4,402,827 | 9/1983 | Joseph . |
| 4,404,006 | 9/1983 | Williams et al. ................ 55/502 |
| 4,410,341 | 10/1983 | Edwards et al. ................ 55/482 |
| 4,414,172 | 11/1983 | Leason . |
| 4,419,166 | 12/1983 | Larson ...................... 210/445 X |
| 4,450,078 | 5/1984 | Walker et al. .................. 210/315 |
| 4,450,081 | 5/1984 | Anderson et al. . |
| 4,558,957 | 12/1985 | Mock et al. . |
| 4,600,511 | 7/1986 | Sherman et al. ............... 210/316 |
| 4,601,927 | 7/1986 | Durfee . |
| 4,604,200 | 8/1986 | Machart, Jr. .................. 210/314 |
| 4,826,598 | 5/1989 | Cain ............................. 55/502 |
| 4,828,694 | 5/1989 | Leason ........................ 210/445 |

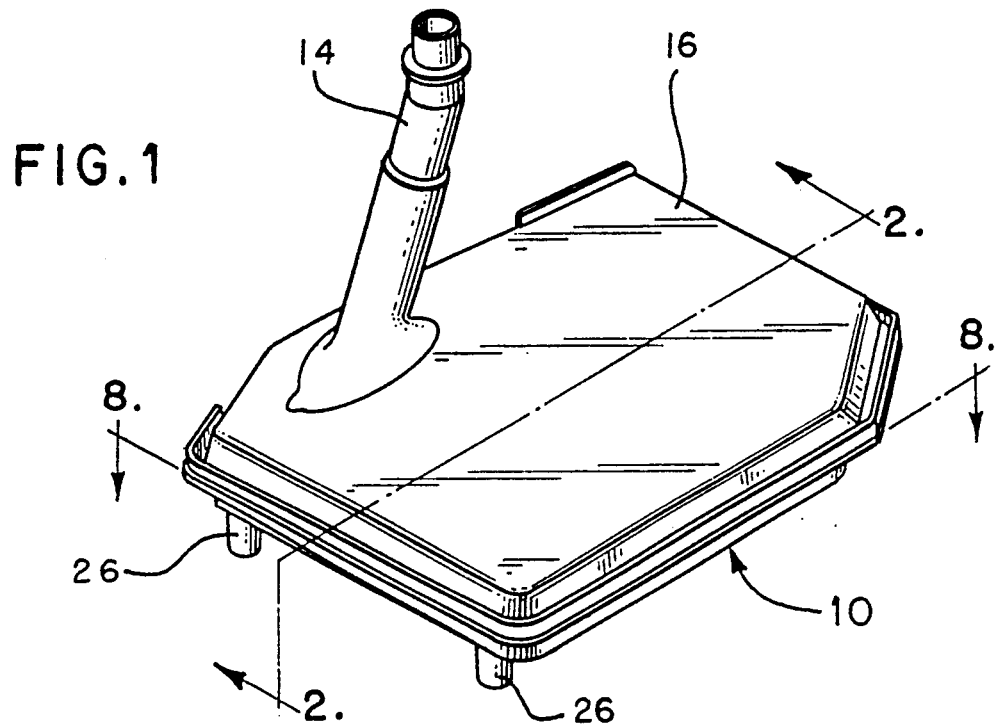
FIG. 1
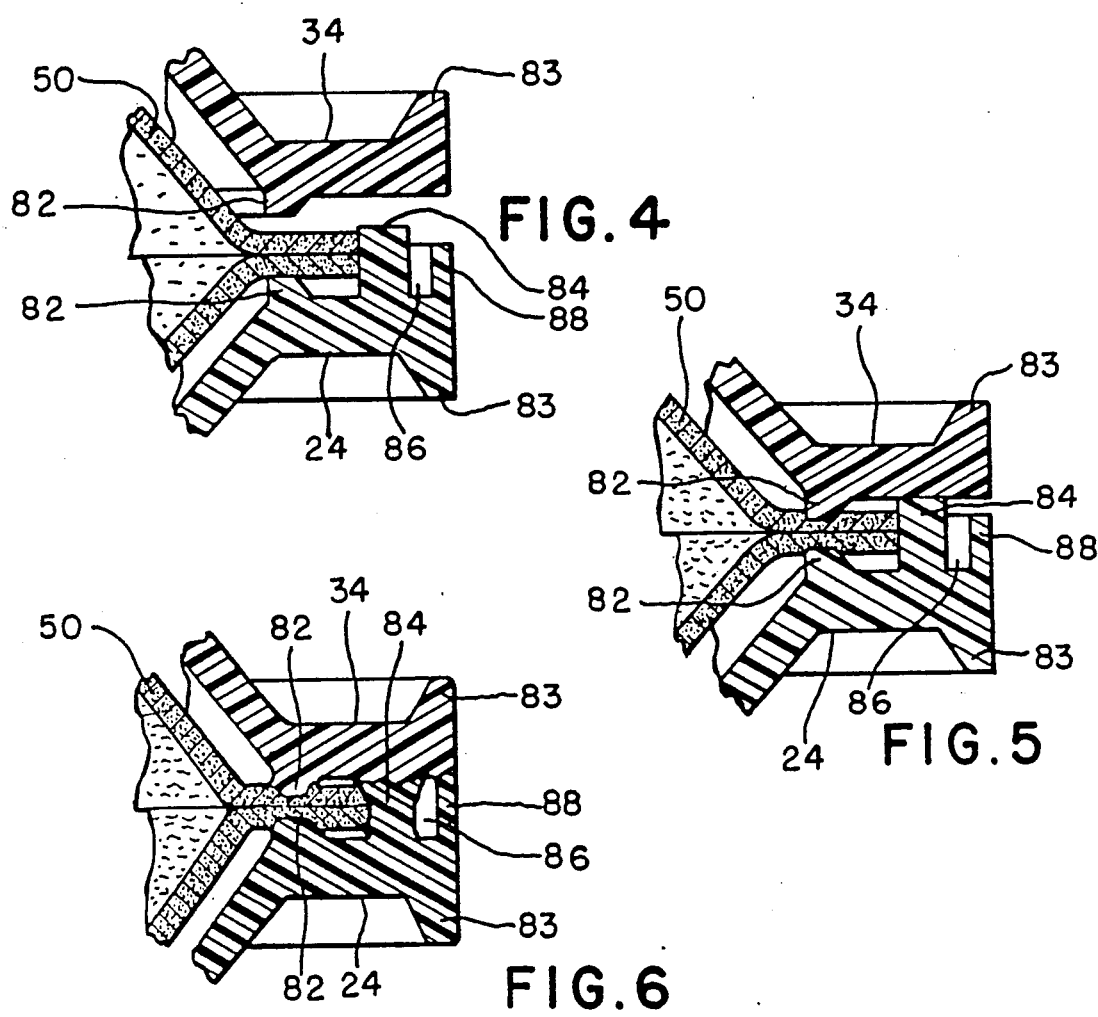
FIG. 4
FIG. 5
FIG. 6

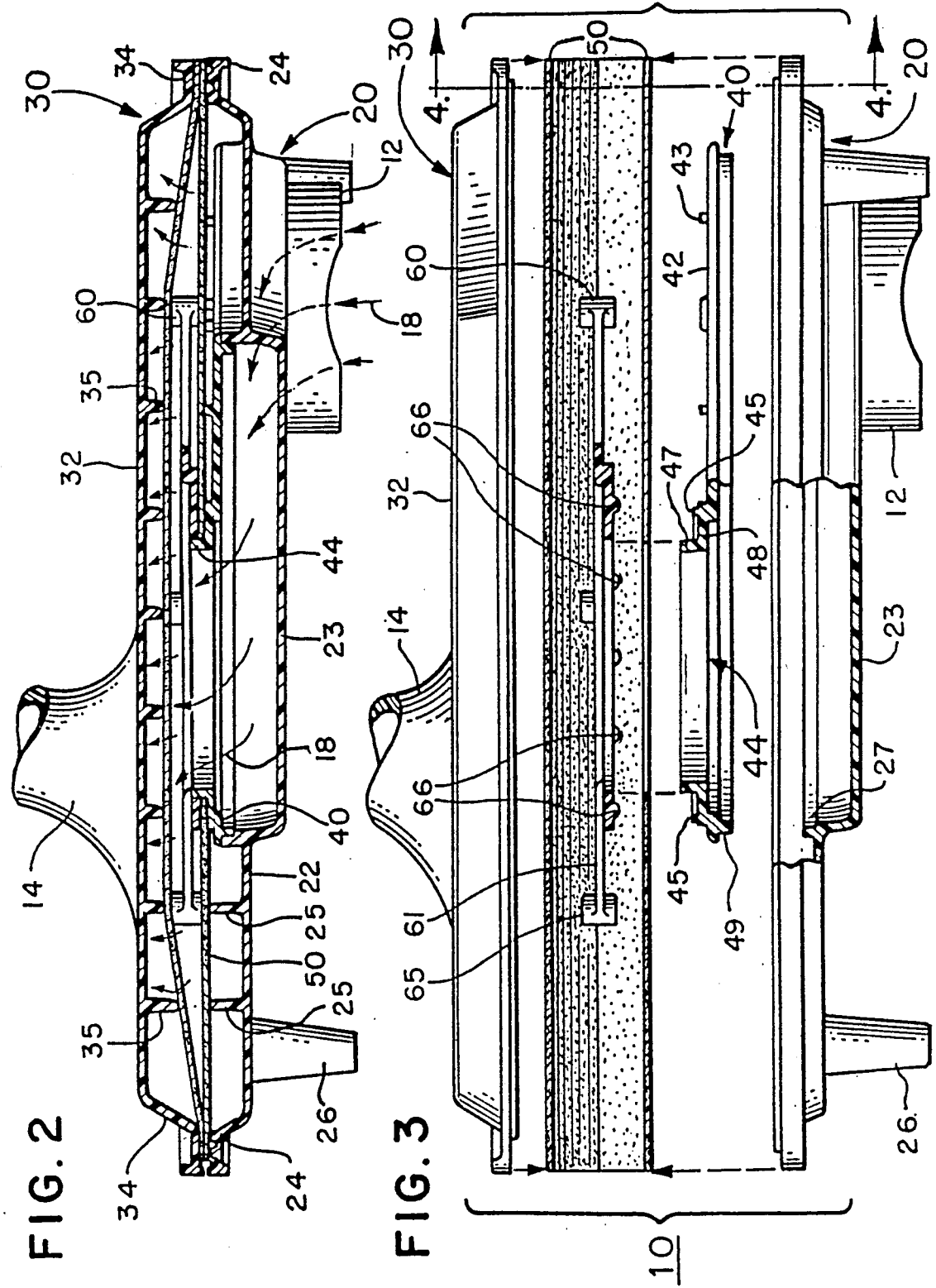

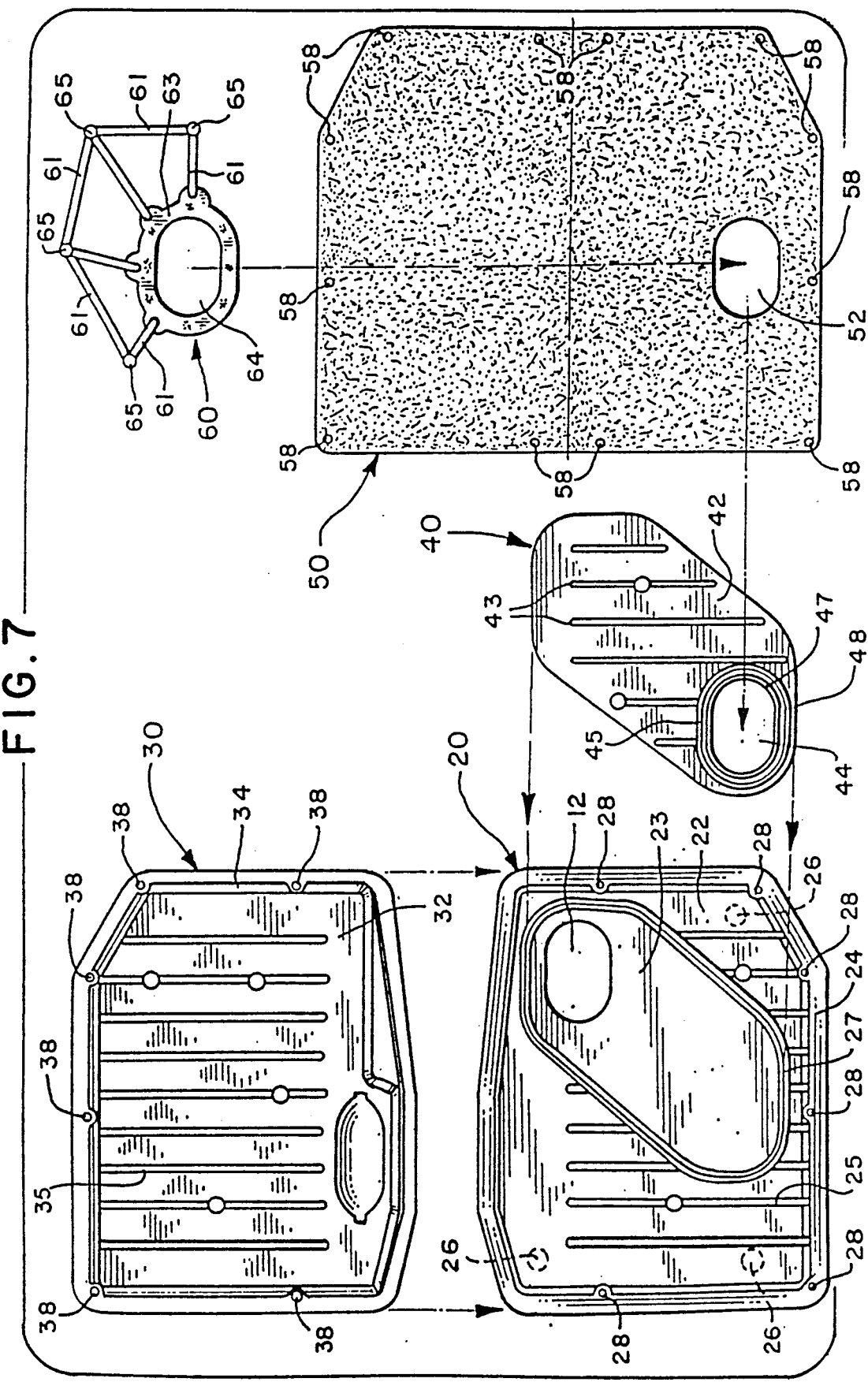

FRICTION WELDING PROCESS AND FILTER FORMED THEREBY

RELATED PATENT APPLICATION

This application is a continuation in-part of two pending applications, Ser. No. 07/142,071 entitled Filter With Filtration Envelope Spacing Means, filed Jan. 11, 1988, in the name of Hayden Leason, now U.S. Pat. No. 4,828,694, and Ser. No. 06/803,127, entitled Hermetically Sealed Transmission Filter, filed Nov. 29, 1985, in the name of Thomas A. Cain, now U.S. Pat. No. 4,826,598.

BACKGROUND OF THE INVENTION

This invention relates to fluid filters and their method of manufacture and, more particularly, to hermetically sealed filters such as automatic transmission fluid filters.

Automatic transmissions require a filter to remove harmful materials from the fluid being circulated through the transmission system. Various configurations of filters have been suggested for use in automatic transmission fluid circulating systems. One such filter is disclosed in U.S. Pat. No. 4,402,827 to Joseph. This filter is made from two generally rectangular cup-shaped pan members having flanged peripheries fastened together in opposed relation. A filter element is made in part from a long piece of resin-impregnated felt, folded over double. The edges of the filter element are captured between the fastened flange sections of the pan members.

Like most automatic transmission filters, the Joseph filter is designed to be placed in the transmission fluid sump area on the inlet side of the fluid pump. For this reason, it has an outlet tube extending up from the top pan member which conveys fluid to the pump. The inlet to the filter is a hole in the pan member positioned so as to be submerged in transmission fluid within the sump.

It is critical that the inlet to the filter remain submerged in transmission fluid. If air is allowed to pass through the filter, it could cause cavitation in the transmission pump and, with a loss in hydraulic pressure to the clutch slippage between the clutch plates. Slippage results in a burning of the drive surfaces of the clutch and complete transmission failure within seconds after slippage begins.

For filters like those in the Joseph patent, having relative wide, flat bodies, the edges of the filter become exposed to air during normal operation of the automobile in which they are used. During violent maneuvers in starting and turning, the fluid in the sump is subjected to forces causing it to slosh to one side or another. If the filter edges are not sealed, air can enter the filter and have the above-described effect.

In the past, filters made from a plastic top pan member and a metal base pan member have been assembled by crimping the edge of the metal around the edge of the plastic member. Tests have shown that such crimping is not effective for sealing the edges airtight. One of the major difficulties in getting such filter members sealed on the edges is that the filters are subject to operating conditions ranging from $-30°$ to $+300°$ F. Under these conditions, it is very difficult to maintain an airtight crimp seal with dissimilar materials. In addition, many sealant materials are not capable of withstanding this operating range.

In the first parent application, now U.S. Pat. No. 4,826,598, a hermetically sealed transmission filter is disclosed. The preferred embodiment of the filter is similar in shape to the filter of the Joseph patent, with a plastic cover member and a metal base member. The filter is provided with a hermetic seal by molding a plastic overmold onto the periphery of the filter after the cover and base members have been placed into alignment with the non-folded edges of the filtration media captured between flanges at the periphery of the filter.

In the second parent application, now U.S. Pat. No. 4,828,694, another hermetically sealed transmission filter is disclosed, again of the shape similar to that of the Joseph patent. Again, the filter is provided with a hermetic seal by applying an overmold to the periphery of the filter. One difference between the filters of the second parent application is that both housing members are made of thermoplastic material.

The disclosures of both U.S. Pat. Nos. 4,826,598 and 4,828,694 are incorporated herein by reference.

One of the difficulties with providing a plastic overmold to produce the required hermetic seal disclosed in the filters of the two parent applications is that the filters must have the overmold applied in an injection molding tool after the pieces are assembled. Not only does this require an additional mold, but it increases production time, since the pieces are generally molded separately, assembled and then accumulated for later overmolding.

SUMMARY OF THE INVENTION

A unique friction welding process has been developed which makes it possible to efficiently produce hermetically sealed filters without the use of the overmold. The process includes the steps of providing base and top thermoplastic filter parts and a section of filtration media; sandwiching the media between sections of the base and top filter parts; applying a compressive force to hold the sandwiched parts together; applying a rapidly repetitive force to at least one of the filter parts to cause relative movement between the filter parts sufficient to cause frictional melting of the filter parts; and maintaining the compressive force after ceasing application of the rapidly repetitive force for a time period sufficient to allow the melted portion of the filter parts to solidify and thereby form a fluid seal at the junction of the filter parts and at the junctions of the filtration media and each of the base and top filter parts.

The present invention also encompasses filters formed by the unique process, wherein the filter comprises thermoplastic housing parts connected at their peripheries to enclose a volume, the volume having an inlet and an outlet; filtration media disposed within the volume between the inlet and the outlet, and a frictional weld joint hermetically sealing the periphery of the filter and sealingly capturing the edges of the filtration media so as to prevent fluid passing from the inlet through the volume from bypassing the media before exiting the outlet.

In the case of a complete filter, the preferable frictional welding process used is high-frequency linear vibration. For internal parts, such as the elliptical tube 50, extension 57 and plate opening 54 shown on FIG. 9 of U.S. Pat. No. 4,828,694, sonic welding is preferred.

In this invention, the seal at the periphery of the filter is formed in the same manufacturing stage as when the parts are assembled, thus reducing production time. In addition, an additional rib of thermoplastic material may melt through the pores of the filtration media. When the melted thermoplastic material cools, it provides the rigidity to hold the media in place. Alternatively, if the additional rib does not melt, in the preferred embodiment it pinches the media together at the edges of the filter. In either event, it forms a seal between each part and the media at the junctions of the filter parts and media.

Other advantages of the present invention, as well as the invention itself, will best be understood in view of the following detailed description of the presently preferred embodiment.

BRIEF DESCRIPTION OF THE DRAWINGS

FIG. 1 is a perspective view of the filter of the preferred embodiment of the present invention.

FIG. 2 is a sectional view taken along line 2—2 of FIG. 1.

FIG. 3 is a partial side view assembly drawing of the parts of the filter shown in FIG. 1.

FIG. 4 is a sectional view taken along line 4—4 of FIG. 3 in a less exploded form.

FIG. 5 is like FIG. 4 except that it shows the parts after the application of the compressive force.

FIG. 6 is like FIG. 5 except that it shows the parts after application of the frictional welding forces.

FIG. 7 is a top view assembly drawing of the parts making up the filter of FIG. 1.

DETAILED DESCRIPTION OF THE PREFERRED EMBODIMENT

Figure 8:
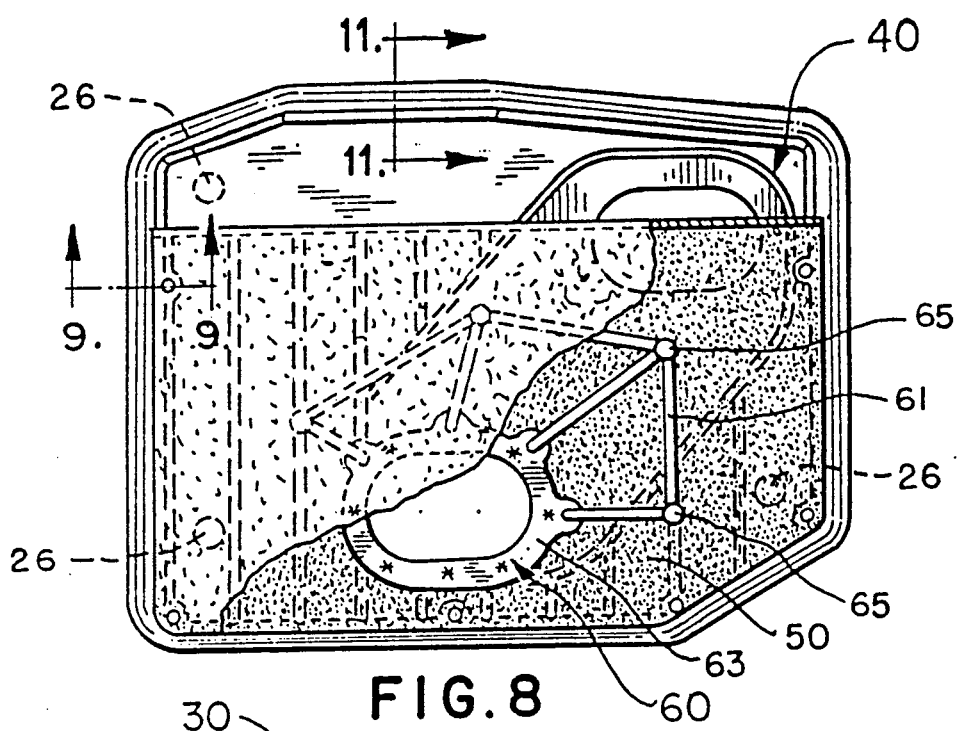
FIG. 8 is a partially cutaway sectional view taken along line 8—8 of FIG. 1.

The filter 10 of the preferred embodiment of the present invention, as shown in FIG. 1, is for use in an automobile automatic transmission. As such it sits in a sump with an inlet 12 (best seen in FIG. 2) on its bottom side and an outlet stem 14 extending upwards from the top of its housing 16 to connect with the inlet side of a transmission fluid pump (not shown).

As best seen in FIGS. 3 and 7, the filter 10 includes a base member 20, a top member 30, a flow deflecting element 40, a doubled over sheet of filtration media 50 and a spacer grid 60. As shown by flow lines 18 in FIG. 2, fluid enters the filter 10 through a hole in the base member 20 forming inlet 12. Because the hole is off center, a flow deflector 40, in conjunction with the shape of the base member 20, deflects the flow to near the center of the filter 40. The fluid is then introduced into a filtration envelope formed by the filtration media 50. The fluid is filtered as it passes through the media 50 into the other sections of the filter, from which it flows up the outlet stem 14 into the transmission pump.

The base member 20 is a generally cup-shaped plastic shell comprising a generally flat base wall 22 and a peripheral flanged edge 24. A depression 23 mates with the flow deflector 40 to channel fluid flow toward the center of the filter. The base member 20 includes generally parallel fluid flow spacer elements 25 extending up from and integral with the base wall 22. As best seen in FIGS. 1, 3 and 7, three leg members 26 are molded into the base member 20. The leg members 26 cooperate with the downwardly extending inlet 12 to hold the filter 10 slightly off the floor of the sump in the automatic transmission. A groove 27 is formed in the base wall 22 surrounding the depression 23, as best seen in FIG. 3. At several points around its periphery, the base member 20 includes locating pins 28, best seen in FIGS. 7, 9 and 10.

The top member 30 is also a generally cup-shaped plastic shell comprising a flat cover wall 32 and peripheral flanged edge 34. The top member 30 also includes generally parallel flow spacer elements 35 extending downwardly from and integral with the cover wall 32. The outlet tube 14 extends upwardly from and is integrally molded with the cover wall 32. At several points around its periphery, mating with the points of locating pins 28, the top member includes holes 38 into which pins 28 fit when the filter is assembled.

The flow deflecting element 40, best seen in FIGS. 3 and 7, is made of a generally flat plate 42 and has ribs 43 upstanding from and integrally molded with its top surface. The plate 42 has an elliptical hole 44 through it near one end. The hole 44 is surrounded by an extension 47 which upstands from the top of the plate 42. An elevated shoulder 48 surrounds the extension 47. A weld bead 45 is formed on the surface of the shoulder 48, similar to the weld bead 58 of U.S. Pat. No. 4,828,694. Around the periphery of the plate 42, and extending downwardly therefrom, is a rim 49. The rim 49 fits into groove 27 of the base member 20 during assembly of the filter 10.

The filtration media 50 is shaped so that it can be doubled over inside the filter. The unfolded edges on three sides are sealingly captured between the peripheries of the base member 20 and top member 30 to form an envelope. An elliptical inlet hole 52 is provided through the media 50 of the same shape and size as the outside of the extension 47 of the flow deflecting element 40. Around the periphery of the media are locating holes 58 which, when the media is folded, match up with the locating pins 28 of the base member 20.

The spacer grid 60 is similar in nature and function as the spacer grid disclosed in U.S. Pat. No. 4,828,694, except that the spacer elements 61 are not parallel to each other. Instead they radiate outwardly from the plate section 63 like spokes on a wheel, or interconnect with end points of other spacer elements 61 like sections of a wheel rim. At the interconnect points the elements 61 form a thickened, cylindrical-shaped terminus 65, best seen in FIGS. 3 and 7. The plate section 63 includes an elliptical hole 64 which has an interference fit with the outside of extension 47. Also, small bumps 66 are formed on the lower side of plate section 63 (best seen in FIG. 3, and the position of which is marked by *'s in FIGS. 7 and 8, though the bumps themselves are not visible from those views).

The filter 10 is assembled by first assembling the flow deflecting element 40, filtration media 50 and spacer grid 60. Just as in U.S. Pat. No. 4,828,694, sonic welding is used to form a seal with the media at the periphery of the extension 47. Sonic welding, well known as a process for joining two thermoplastic members, involves applying a rapidly repetitive force (generated by a sonic welding horn) to one of the members while the other member is held by or against a stationary anvil. (For example, see U.S. Pat. No. 3,468,731 to Obeda, incorporated herein by reference.) The forces are generally applied in a direction perpendicular to the joint line between the parts, though forces applied from different positions may be used.

In the preferred embodiment, a two-step process is used to make a unique weld between two filter pieces and the filtration media. The two-step process has been found to be an improvement over a single-step process due to ununiformities in the filtration media 50. First the inlet hole 52 of the media is placed around extension 47 and on top of shoulder 48 of the flow deflecting element 40. A sonic welding horn, shaped to fit around the extension 47, is used to compress the filtration media 50 against the shoulder 48 so that the media 50 is a uniform thickness. Ultrasonic vibratory forces are then applied, which causes the media 50 to partially melt, along with the surface of the thermoplastic material making up shoulder 48. The horn is removed and the spacer grid 60 is positioned to sandwich the media 50 between the plate section 63 and the shoulder 48. The same horn is again put into place, again pressing down against the back side of plate section 63. The bumps 66 and weld bead 45 act to bite into the media 50 and direct the ultrasonic energy. As the ultrasonic vibratory forces are applied the second time, the plate section 63, shoulder 48 and media 50 sandwiched therebetween melt to form an amalgam. As the melted material cools it forms a fluid seal at the coinciding junctions of the plate section 63, shoulder 48 and media 50.

The combined spacer grid 60, media 50 and flow deflecting element 40 are then placed inside the base member 30. The flow deflecting element 40 is fixed to the base member 30, creating a channel for deflecting flow from one corner of the filter to near its center. The two pieces are sealed together by an adhesive. The media 50, still in unfolded form, is put in place with half of holes 58 going over the locating pins 28. The flow directing elements 25 and ribs 43 hold the filtration media 50 from contacting the base wall 22 and plate 42, allowing for free flow over these elements.

The media 50 is next folded over and the remaining holes 58 placed over the pins 28. Finally the top member 30 is snapped into place, with the pins 28 fitting into holes 38. The flow directing elements 35 prevent the media 50 from contacting the cover wall 32.

Figure 9:
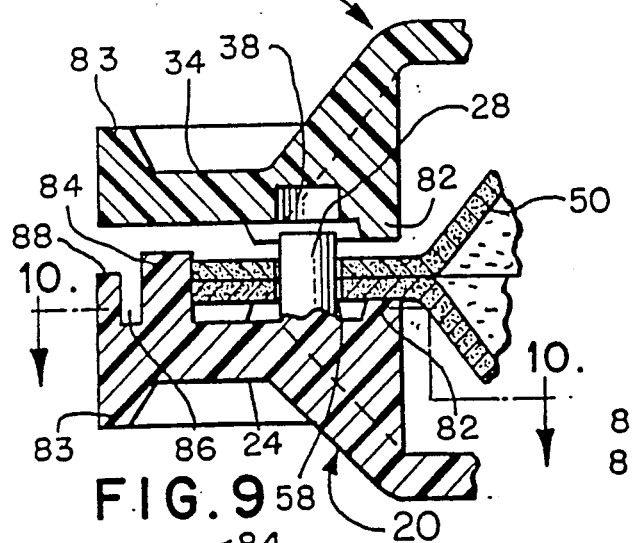
FIG. 9 is like FIG. 4 except that it is taken along line 9—9 of FIG. 8.
Figure 11:
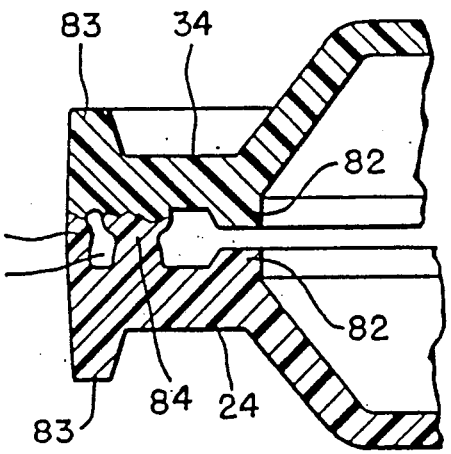
FIG. 11 is like FIG. 6 except that it is taken along line 11—11 of FIG. 8.
Figure 10:
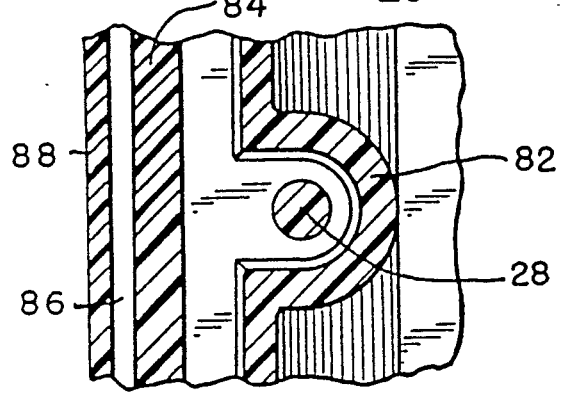
FIG. 10 is a sectional view taken along line 10—10 of FIG. 9.

The flanged edges 24 and 34 are provided with special shapes, best shown in FIGS. 4–6, 9 and 11, for providing high-frequency linear vibration friction welds to the peripheries of the filter 10. Surrounding the entire periphery of both flanged edges are projecting ribs 82 at the inside edge of the flanges. As shown in FIGS. 5, 6 and 9, the projecting ribs 82 contact media 50 on three sides of the filter, capturing the unfolded edges of the media 50. As shown in FIGS. 8 and 11, on the fourth side the envelope does not extend to the edge of the filter. The projecting ribs 82 form a semi-circular shape around the pins 28 on the base member 20 as shown in FIG. 10, and around the holes 38 in the top member 30.

Other than the projecting ribs 82 on the flanged edge 34 of the top member 30, the mating surface of the flanged edge 34 is smooth. However, the flanged edge 24 of the base member includes, on its mating surface, an interfering rib 84, trap 86 and edge member 88. In addition, both flanged edges 24 and 34 include rims 83 on the outside edge of their outward facing surfaces. The purpose of the rims 83 is to help hold the parts in the tool which is used to effect high-frequency linear vibration welding.

The high-frequency linear vibration welding is performed in an apparatus such as that disclosed in U.S. Pat. No. 4,086,112 to J. V. Bouyoucos, et al., incorporated herein by reference. The apparatus includes a lower clamp plate which includes a nest shaped to securely hold the base member 20. It also includes a vibrating top platen which has a nest plate for closely holding the top member 30. When activated, the apparatus forces the base and top members together in an aligned position, and applies a clamping force. When the clamping force is applied, the interfering rib 84 of the base member flange 24 contacts the smooth face of the top member flange 34, and the projecting ribs 82 compress the media 50 captured between them, as shown in FIG. 5.

Next the apparatus applies a rapidly repetitive force to the top member 30 in a direction generally parallel to the joint line between the filter parts, causing the top member to linearly vibrate with respect to the base member 20. During this movement, the friction between the interfering rib 84 and the top member flange 34 causes friction and melting of the thermoplastic material, allowing the parts to move closer together under the compressive clamping force, as shown in FIG. 6. The melted material flows to either side of rib 84, some into trap 86 and some into the edges of the media 50. During the process the locating pins 28 probably shear between the top and base parts. However, by then they have served their purpose, and the melting which occurs seals any space left by such breaks. After a short period, the vibration is stopped, but the clamping force is maintained for a time period sufficient to allow the melted portion of the filter parts to solidify and thereby form a hermetic seal.

In the finished filter 10, the projecting ribs 82 compress the media 50 and secure the edges to not only hold the envelope closed but also to provide a fluid seal at the edges of the media.

In the preferred embodiment, the projecting ribs 82 are sized and shaped so that when the clamping force is applied they put pressure on the media 50. During the vibration motion, frictional melting also occurs where the projecting ribs 82 contact the media 50; forming a hermetic seal between the media 50 and the filter housing members. In that case it is helpful that the filtration media used be capable of withstanding a temperature in excess of the melting point of the thermoplastic filter parts without losing its integrity.

As shown in FIG. 6, the edge member 88 comes in contact with the inside surface of flange 34 at the end of the frictional welding cycle. While this contact may be used to further seal the periphery of the filter 10, the edge member 88 is used to cover the melted interfering rib 84 and give a more finished appearance to the welded filter.

In the preferred embodiment, the bottom member 20, top member 30, flow deflecting element 40 and spacer grid 60 are made of glass filled nylon. The media 50 is a phenolic resin-impregnated polyester felt having a retention of 60 micron size particles. The thickness of the felt is in the range of 0.050" to 0.090". The preferred uniform thickness for compressing the media 50 around the extension 47 in the first step of the sonic welding process is 0.040". In both steps of the sonic welding process, the equipment is set to deliver 1.4 kilojoules of energy. This setting has been found to provide adequate energy in both steps without melting a hole through the felt and without requiring a change in machine settings between steps.

The preferred linear vibration welding apparatus is the Viton Hydroweld model LVW4S, from Vinton, Inc., Box 23447, Rochester, N.Y. 14692. While appropriate settings on the apparatus depend on the shape of the parts and their composition, a frequency setting of 21.5, meltdown of 0.020" to 0.030" and clamp pressure of 300 psi to 500 psi has been found to work for welding filters of the preferred embodiment. These settings in an automatic mode result in a two second weld time, five second cycle time and a relative movement amplitude registering between +1 and +2. It is believed that changing the frequency so that the cycle time increases for the same melt down would improve the weld at the expense of the manufacturing speed.

One problem with excessive weld times is that the projecting ribs 82 could cut the media 50, leaving a hole in the envelope. This is especially true for polyester screen type media. This, however, may be used to an advantage. Rather than cutting the media to fit inside of a filter, if careful assembly procedures are used it is possible to leave the media wider than the filter, and when the filter edges are welded together the excess media is also cut off from the media inside the filter during the high-frequency linear vibration welding process.

The use of a thin screen material would require modification of the projecting ribs 82, shown for use of a felt type media 50. Alternatively, a felt gasket could be used at the periphery with the screen to assure enough bulk for adequate capture and sealing of the edges of the media without modifying projecting ribs 82. Another modification which may be made to the ribs 82 is to make them higher on the back side of the filter adjacent the folded edge of the media 50. Since the ribs 82 do not capture the media at this point, increasing the rib height would allow the ribs 82 to come together at the end of the linear vibration welding step, thus closing a gap which might otherwise exist.

Because the linear vibration equipment exerts a force in only one direction, depending on placement of the assembled filter 10 in the equipment, it is probable that part of the interfering rib 84 will run parallel with the direction of movement during welding, and part will run perpendicular. It is suggested that the rib 84 be made slightly wider (100%-150%) in those places where the rib 84 runs perpendicular to the direction of linear vibration movement.

Figure 12:
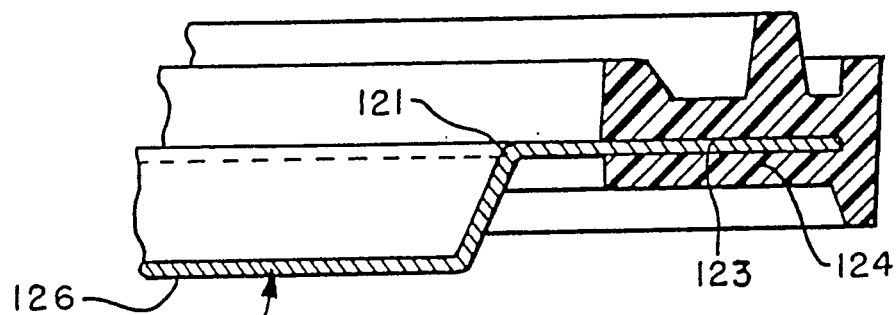
FIG. 12 is a sectional view showing the flange detail of a modified embodiment of the filter of FIG. 1 having a thermoplastic material molded onto a metal base member.

In many instances it is believed preferable to have a metal base member in automatic transmission filters. The present invention can still be used by molding a thermoplastic flange 124 onto a flange area 123 of such a metal base member 120, as shown in FIG. 12. In this regard, the phrase "thermoplastic filter part" includes parts which are part metal but which have a thermoplastic component which can be used in frictional welding processes. The flange 124 has the same top profile as flange 24. Thus, the base member 120 may be used with a top member 30. The flange 124 needs to be offset from the bend 121 in the metal base member 120 by at least about 0.100", which is the minimum thickness for the lock up ring in the mold tool.

The flange 123 of the metal pan member 120 could be designed such as the flange in U.S. Pat. No. 4,826,598, FIGS. 4, 4a and 4b, so as to assure that the thermoplastic flange 124 does not disassociate from the metal base member 120. However, the preferred embodiment of the flange 123 of the metal base member 120 has bridging metal sections 127 as shown in FIGS. 13 and 14, formed by stamping the flange 123 with a pointed die.

When the metal base member 120 used has a thickness of 0.020", the total height of the section 127 needs to be about 0.060" so that the hole under the bridging apex of section 127 is 0.040". This size of a hole is about the minimum required for plastic to flow into the hole during molding of the thermoplastic flange 124 to the flange 123. The flange 124 has a plastic thickness of about 0.060" on each side of the metal flange 123. This means that the plastic over the apex of the bridging metal section 127 has a thickness of about 0.020".

Figure 13:
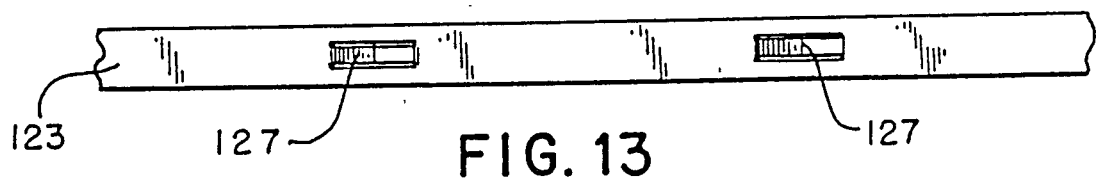
FIG. 13 is a top plan view of a section of the flange of the base member of FIG. 12 prior to molding the thermoplastic thereto.
Figure 14:
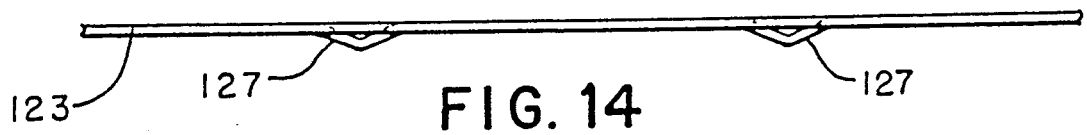
FIG. 14 is a side elevation view of the flange section of FIG. 13.
Figure 15:
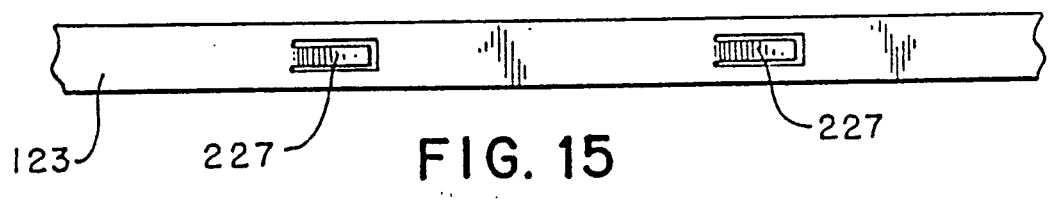
FIGS. 15 and 16 are identical to FIGS. 13 and 14 respectively, showing a different embodiment of the metal flange configuration.
Figure 16:
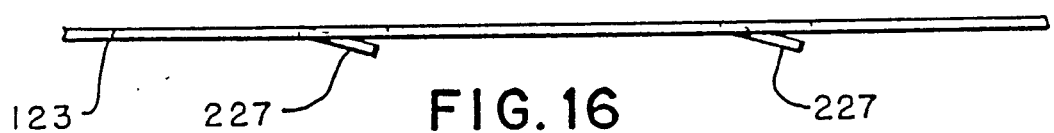

The reason the design of FIG. 13 is preferred is that there are no metal slugs produced in the metal stamping operation, which could later end up in a filter, possibly on the downstream side. A less preferred shape of the metal flange 123 is shown in FIGS. 15 and 16, where the metal sections 227 are attached on only one end instead of bridging.

If a metal base member 120 with a thermoplastic flange 124 is used, the inlet hole 52 of media 50 may be directly attached to an inlet hole in the metal pan member 126 (FIG. 12) by a metal grommet, also referred to as a continuous eyelet (see TM 48 in FIG. 2 of U.S. Pat. No. 4,826,598 and TM 95 in FIG. 2 of U.S. Pat. No. 4,828,694).

While the preferred embodiment of the present invention has been disclosed, and several modifications have been suggested, it is recognized that other changes may be made without departing from the present invention. For example, flow deflecting element 40 may be deleted and the inlet 12 configured with an extension such as in FIG. 9 of U.S. Pat. No. 4,828,694. Also, the spacer grid, where used, can be any shape and configuration necessary to fit the filter. Therefore, it should be understood that the preferred embodiments described herein are merely illustrative of various aspects of the invention, and that the claims, including all equivalents, define the present invention.

The invention claimed is:

1. A process of sealing fibrous filtration media and thermoplastic filter parts comprising the steps of:
   a) providing first and second thermoplastic filter parts each with a thermoplastic flange on the periphery thereof, the flanges each comprising opposing projecting ribs and at least one of the flanges comprising an interfering rib spaced from said opposing ribs and projecting towards the other flange;
   b) providing a section of fibrous filtration media;
   c) sandwiching the media between sections of the first and second filter parts so that at least a portion of the periphery of the media is captured between said opposing projecting ribs;

d) applying a compressive force to hold the sandwiched parts together;

e) applying a rapidly repetitive force in a direction generally parallel to a joint line between the parts to at least one of said filter parts to cause relative movement between the filter parts sufficient to cause frictional melting of the interfering rib; and f) maintaining the compressive force after ceasing application of the rapidly repetitive force for a time period sufficient to allow the melted interfering rib to bond to said other flange and thereby form a fluid seal at the junction of the filter parts, said opposing ribs also forming a fluid seal at the junctions of the filtration media and each of the first and second filter parts.

2. The process of claim 1 wherein at least one of the first and second thermoplastic filter parts comprises a metal base member and a thermoplastic flange molded on the periphery thereof.

3. A filter comprising:

a) two thermoplastic housing parts each comprising cup-shaped top and base members and each having extended flange portions connected at their periphery to enclose a volume, the volume having an inlet and an outlet, the flanges each including an opposing projecting rib and at least one of the flanges including an interfering rib spaced from the opposing projecting rib and projecting toward the other flange;

b) fibrous filtration media disposed within the volume between said inlet and said outlet; and c) a frictional weld joint formed between the interfering rib and the opposing surface of the said other flange hermetically sealing the periphery of the filter, said opposing projecting ribs sealingly capturing the edges of the filtration media so as to prevent fluid passing from the inlet through the volume from bypassing the media before exiting through the outlet.

4. The filter of claim 3 wherein the weld joint comprises an outer hermetic seal formed around the complete perimeter of the filter between parts of the flanges directly in contact with one another and an inner fluid tight seal between the housing parts and the edges of the filtration media.

5. The filter of claim 3 wherein the filtration media comprises a folded sheet of media, the folded edge being disposed within the volume and the non-folded edge being sealingly captured at the periphery of the filter, forming a filtration media envelope within the filter.

6. The filter of claim 5 further comprising a spacer grid within the filtration media envelope.

7. The filter of claim 5 further including a flow deflecting element internal to the filter and connected to the filtration media envelope so as to transfer fluid from the filter inlet into the interior of the envelope.

8. The filter of claim 3 wherein at least one of the thermoplastic housing parts comprises a metal member having a thermoplastic flange molded on the periphery thereof.

9. The filter of claim 8 wherein the metal member includes bridging sections spaced at its periphery in contact with the thermoplastic flange into which thermoplastic material flows during molding of the flange to the metal member.

10. A process for forming a hermetically sealed filter, comprising the steps of:

a) providing thermoplastic filter housing parts capable of being joined together at their periphery to provide a filter housing having an inlet and an outlet, said housing parts each comprising a flange, at least one of the flanges including an interfering rib thereon projecting towards the other flange and suitable for forming a vibration welding weld with the other flange, said flanges each including an opposing projecting rib spaced toward the inside of the volume from the interfering rib;

b) providing a sheet of fibrous filtration material in a form to fit within the housing between the inlet and the outlet so that the edges of the sheet extend past the opposing projections; and c) vibration welding the housing parts together such that the interfering rib melts to form a hermetic seal with the opposing flange at the periphery of the filter housing and, simultaneously, the opposing projecting ribs bond to and form a fluid seal with the filtration material.

11. The process of claim 10 wherein the sheet of filtration material forms an envelope within said volume, and non-folded edges of said envelope are captured between the opposing projecting ribs to seal those edges of the envelope.

12. The process of claim 10 wherein the sheet of filtration material extends beyond the periphery of the filter and the process of vibration welding also severs the filter material extending beyond the periphery from that remaining in the housing.

13. The process of claim 10 wherein the filtration material comprises resin-impregnated felt.

14. The process of claim 10 wherein at least one of said thermoplastic filter housing parts comprises a metal member with a thermoplastic flange molded on the periphery thereof.

15. The process of claim 14 wherein the metal member includes bridging sections spaced at its periphery in contact with the thermoplastic flange into which the thermoplastic material flows during molding of the flange to the metal member.

16. The process of claim 17 wherein the filtration media comprises a flat sheet of material folded over with the fold disposed inside the filter and wherein the vibratory welding process seals the unfolded edges of the sheet of filtration material at the periphery of the housing.

17. A method of producing a fluid flow filter comprising the steps of:

a) providing thermoplastic housing members which, when sealed together, cooperate to form a filter housing, the peripheral edges of said housing members each comprising a flange, at least one of the flanges including an interfering rib projecting towards the other flange suitable for forming a vibration welding weld and said flanges each further including an opposing projecting rib spaced toward the inside of the housing from the interfering rib;

b) providing a porous, fibrous filtration media;

c) placing the filtration media between the housing members such that the edges of the media are captured by said opposing projecting ribs during assembly of the filter; and d) applying a vibratory welding process to the assembled filter sufficient to form a hermetic seal between the interfering rib and the opposing flange and to simultaneously cause the opposing projecting ribs to firmly hold the filtration media within the housing such that no fluid flowing through the filter can bypass the filtration media.

18. A hermetically sealed filter comprising:
a) first and second thermoplastic filter housing parts each having peripheral flanges, the housing parts being capable of being joined together at their periphery to provide a filter housing having an inlet and an outlet, the flange of the first of said housing parts including an interfering rib projecting towards and being suitable for forming a vibration welding weld to the flange of the second of said housing parts, each of said flanges further including an opposing projecting rib spaced toward the inside of the volume from the interfering rib;
b) a sheet of fibrous filtration material fit within the housing between the inlet and the outlet with the edges of the sheet extending past the opposing projections; and
c) said interfering rib being melted to the flange of the second housing part to form a hermetic seal at the periphery of the filter housing and the opposing projecting ribs forming a fluid seal with the filtration material.

19. The filter of claim 18 wherein the sheet of filtration material forms an envelope within said volume, and non-folded edges of said envelope are captured between the opposing projecting ribs to seal those edges of the envelope.

20. The filter of claim 18 wherein the filtration material comprises resin-impregnated felt.

21. The filter of claim 18 wherein at least one of said first and second thermoplastic filter housing parts comprises a metal member with a thermoplastic flange molded on the periphery thereof.

22. The filter of claim 21 wherein the metal member includes bridging sections spaced at its periphery in contact with the thermoplastic flange into which the thermoplastic material flows during molding of the flange to the metal member.

* * * * *

UNITED STATES PATENT AND TRADEMARK OFFICE
CERTIFICATE OF CORRECTION

PATENT NO. : 5,049,274
DATED : September 17, 1991
INVENTOR(S) : Hayden Leason et al.

Page 1 of 2

It is certified that error appears in the above-identified patent and that said Letters Patent is hereby corrected as shown below:

On the cover page under the heading "OTHER PUBLICATIONS", in line 6 after "Describing" please delete --,--; and in line 9, please delete "Hydroweld TM" and substitute therefor --Hydroweld™--.

In column 1, line 6 please delete "continuation in-part" and substitute therefor --continuation-in-part--; and in line 7 after "07/142,071" please insert --,--.

In column 1, line 43, after the first occurrence of "clutch" please insert --,--.

In column 3, line 46, after "14" please insert --,--.

In column 7, line 3, please delete "glass filled" and substitute therefor --glass-filled--.

UNITED STATES PATENT AND TRADEMARK OFFICE
CERTIFICATE OF CORRECTION

PATENT NO. : 5,049,274
DATED : September 17, 1991
INVENTOR(S) : Hayden Leason et al.

It is certified that error appears in the above-identified patent and that said Letters Patent is hereby corrected as shown below:

In column 8, line 38, before "48" please delete "TM" and substitute therefor --#--; and in line 39, before "95" please delete "TM" and substitute therefor --#--.

Signed and Sealed this

Thirtieth Day of March, 1993

*Attest:*

STEPHEN G. KUNIN

*Attesting Officer*   *Acting Commissioner of Patents and Trademarks*